United States Patent [19]

Chassaing et al.

[11] Patent Number: 4,659,137
[45] Date of Patent: Apr. 21, 1987

[54] BEDDING INSTALLATION FOR ROAD VEHICLE CABS

[75] Inventors: Claude Chassaing, Versailles; Jean-Claude Collart, Viroflay; Yves Lubert, La Celle Saint-Cloud, all of France

[73] Assignee: Renault Vehicules Industriels, Lyons, France

[21] Appl. No.: 657,511

[22] Filed: Oct. 4, 1984

[30] Foreign Application Priority Data

Oct. 4, 1983 [FR] France ............... 83 15771

[51] Int. Cl.⁴ .............................. B60N 1/10
[52] U.S. Cl. ..................... 296/190; 296/69; 297/395; 5/118
[58] Field of Search ........... 296/69, 63, 65 A, 65 R, 296/37.6, 190; 297/192, 193, 395; 5/118, 110, 111, 120, 123

[56] References Cited

U.S. PATENT DOCUMENTS

| 1,454,618 | 5/1923 | Banks | 296/63 |
| 1,980,559 | 11/1934 | Thompson | 296/69 |
| 3,588,168 | 6/1971 | Froitzheim et al. | 296/190 |
| 4,018,166 | 4/1977 | Gutridge et al. | 296/69 |
| 4,108,487 | 8/1978 | Spohn | 296/190 |

FOREIGN PATENT DOCUMENTS

| 939553 | 1/1956 | Fed. Rep. of Germany | 296/69 |
| 2348264 | 5/1973 | Fed. Rep. of Germany | 296/190 |
| 1439775 | 4/1966 | France | 296/190 |
| 2337641 | 8/1977 | France | 296/190 |
| 2348843 | 11/1977 | France | 296/190 |
| 2464874 | 3/1981 | France | 296/190 |
| 2473000 | 7/1981 | France | 296/190 |
| 1037730 | 8/1966 | United Kingdom | 296/190 |
| 1560262 | 2/1980 | United Kingdom | 296/190 |
| 1574909 | 9/1980 | United Kingdom | 296/190 |

Primary Examiner—Randolph A. Reese
Assistant Examiner—Carol L. Olson
Attorney, Agent, or Firm—Oblon, Fisher, Spivak, McClelland & Maier

[57] ABSTRACT

A bedding installation with two superposed bunks (6, 7) in which the upper bunk (7) has, along its lengthwise side (8b) opposite to the lengthwise side (8a) contiguous with the back wall (1) of the cab, a padded rim (9) and a median lengthwise folding axis (D) allowing the lengthwise sides (8a, 8b) of the bunk (7) to be brought together to its storage position in which the padded rim (9) constitutes a headrest which extends upward from a raisable lengthwise side (6a) of the lower bunk (6).

6 Claims, 5 Drawing Figures

BEDDING INSTALLATION FOR ROAD VEHICLE CABS

FIELD OF THE INVENTION

The invention relates to a bedding installation for road vehicle cabs comprising two superposed bunks mounted behind the driver's seat and the passenger's seat, respectively, fastened to the back limiting wall of the cab and placed between the side walls of the cab, and in which the upper bunk is fastened in a pivoting manner to the cab by one of its lengthwise sides and is held by its other lengthwise side, on the one hand, in the bedding position and, on the other hand, in a position in which said upper bunk serves as a seat element for the lower bunk when this latter is used as the seating surface for an additional seat.

DISCUSSION OF THE BACKGROUND

The unsolved problem for a seat, described for example in patent FR-A- No. 1 584 361, is that it does not make it possible to sit comfortably because of its slight distance from the row of the driver and passenger seats. During stops at roadside rest areas, it is not unusual for the driver to to sit on this seat to eat or to take a nap.

SUMMARY OF THE INVENTION

The invention therefore has as its object to provide a bedding installation for cabs in which the lower bunk can act both as a seat and a bunk.

According to the invention, this problem is solved by the fact that the upper bunk has, on the one hand, along its lengthwise side opposite to the one carrying the joint, a padded rim and, on the other hand, a median longitudinal folding axis making it possible to bring the lengthwise sides of this bunk together to its storage position in which the padded rim constitutes a headrest which extends a raisable lengthwise side of the lower bunk upward, when the other lengthwise side of this latter bunk limits, toward the front, the seating surface of the additional seat.

A cab thus equipped can therefore offer an arrangement for possible additional passengers. The arrangement of this upper bunk here plays a very advantageous role in the sense that the two portions of the folded bunk delimit a storage arrangement for the bunk and various objects and products without fastening in the cab. Consequently, putting the bedding in place corresponding to the upper bunk is also much faster than in installations not known.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
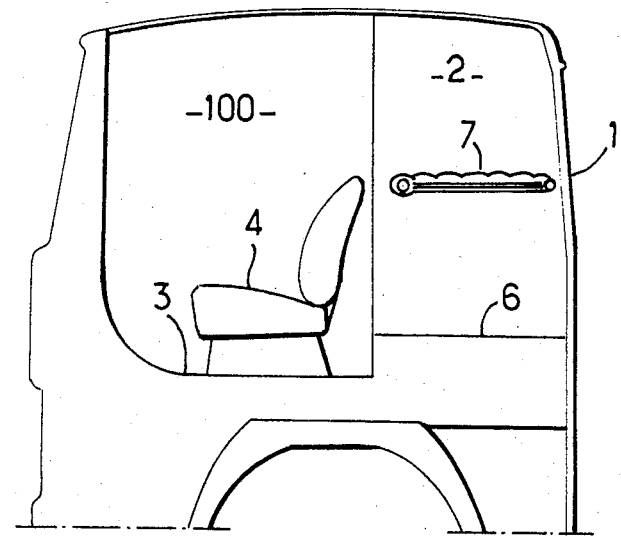
FIG. 1 is a side elevational view of a cab whose lateral side has been removed to show the bedding installation in use position.
Figure 2:
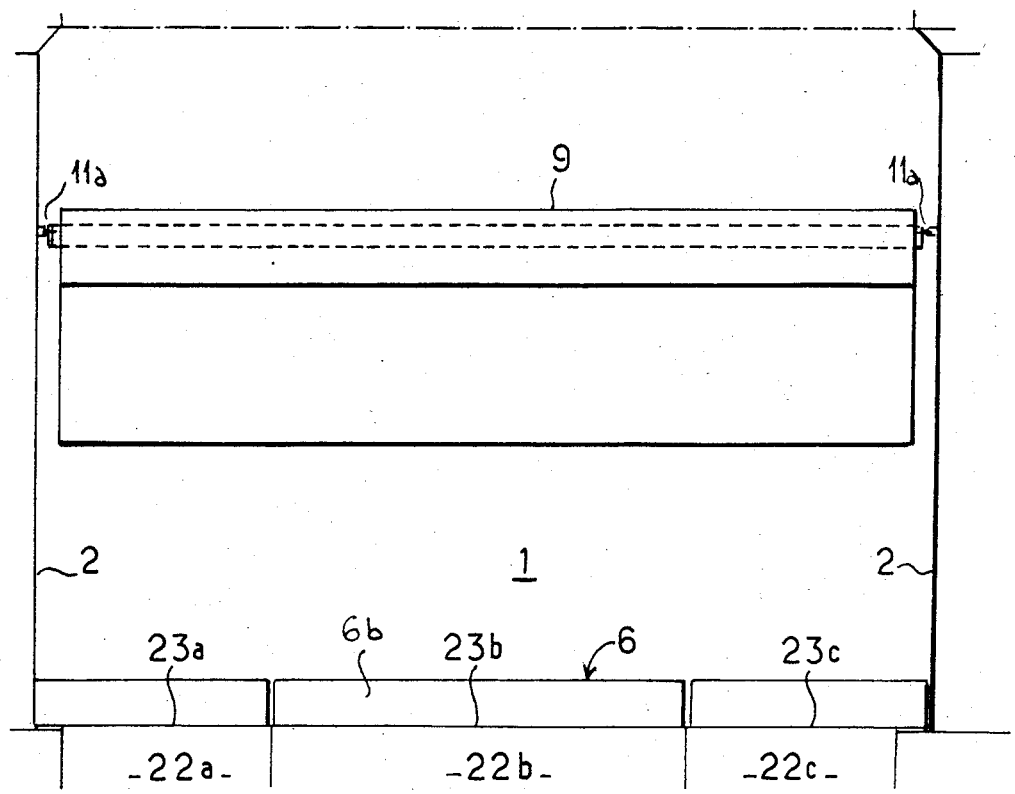
FIG. 2 is a cross sectional view of the cab shown in FIG. 1.

The drawings show the inside of a road vehicle cab 100, limited particularly by back wall 1, side walls 2 and floor 3. The floor supports a row of seats consisting, for example, of the driver's seat 4 and passenger's seat 5. A bedding installation according to the invention is in the space between back wall 1 and said row of seats. The bedding installation consists of a lower bunk 6 and an upper bunk 7 respectively fastened to back wall 1 and placed between two side walls 2.

Upper bunk 7 comprises two lengthwise sides 8a, 8b, one of which, 8a, is fastened to back wall 1 and the other, 8b, carries a padded rim 9. In the vicinity of side 8a, a shaft 10a extends lengthwise and is incorporated in the bedding and engaged in two support pivot bearings 11a respectively fastened to side walls 2.

A shaft 10b goes through lengthwise side 8b carrying padded rim 9 and the ends of the shaft respectively carry a tension arm 12 whose free end is mounted to pivot around a shaft 13 fastened in position on wall 2.

Figure 3:
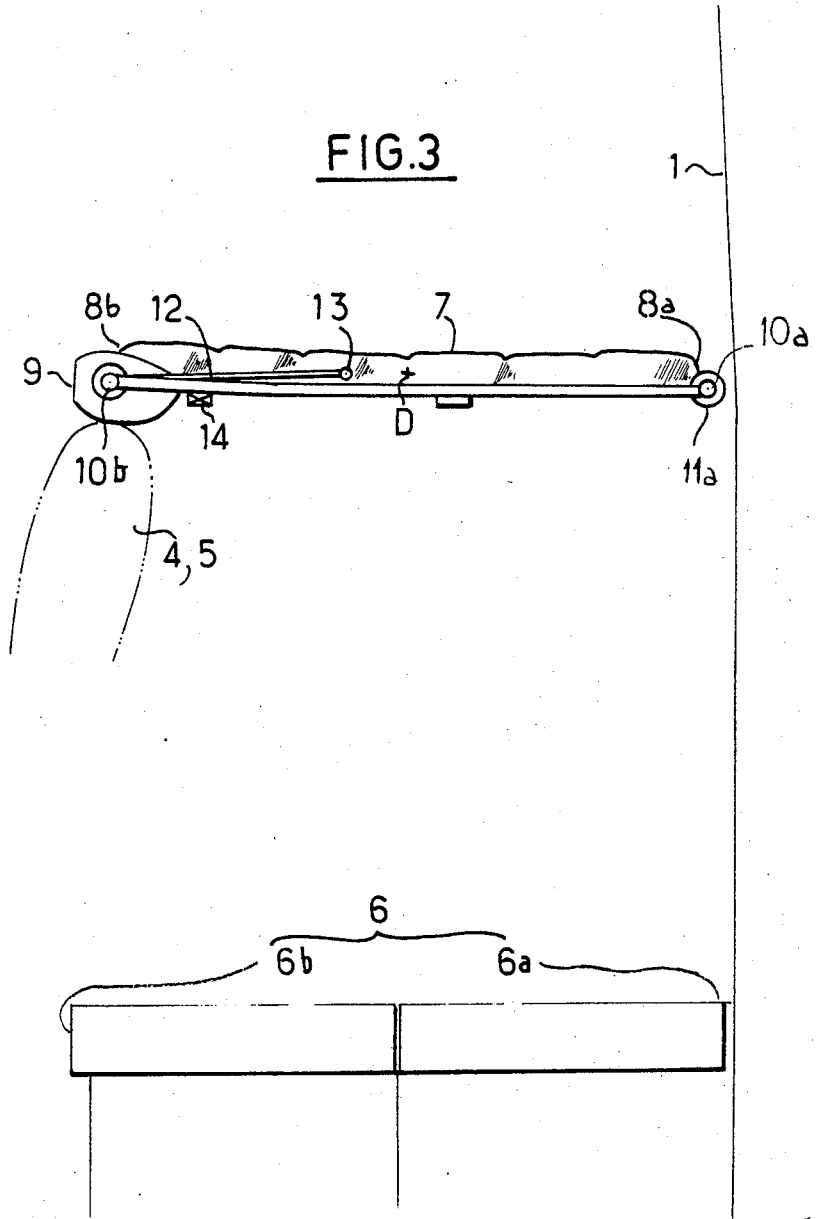
FIG. 3 is a median sectional view of the bedding installation.
Figure 4:
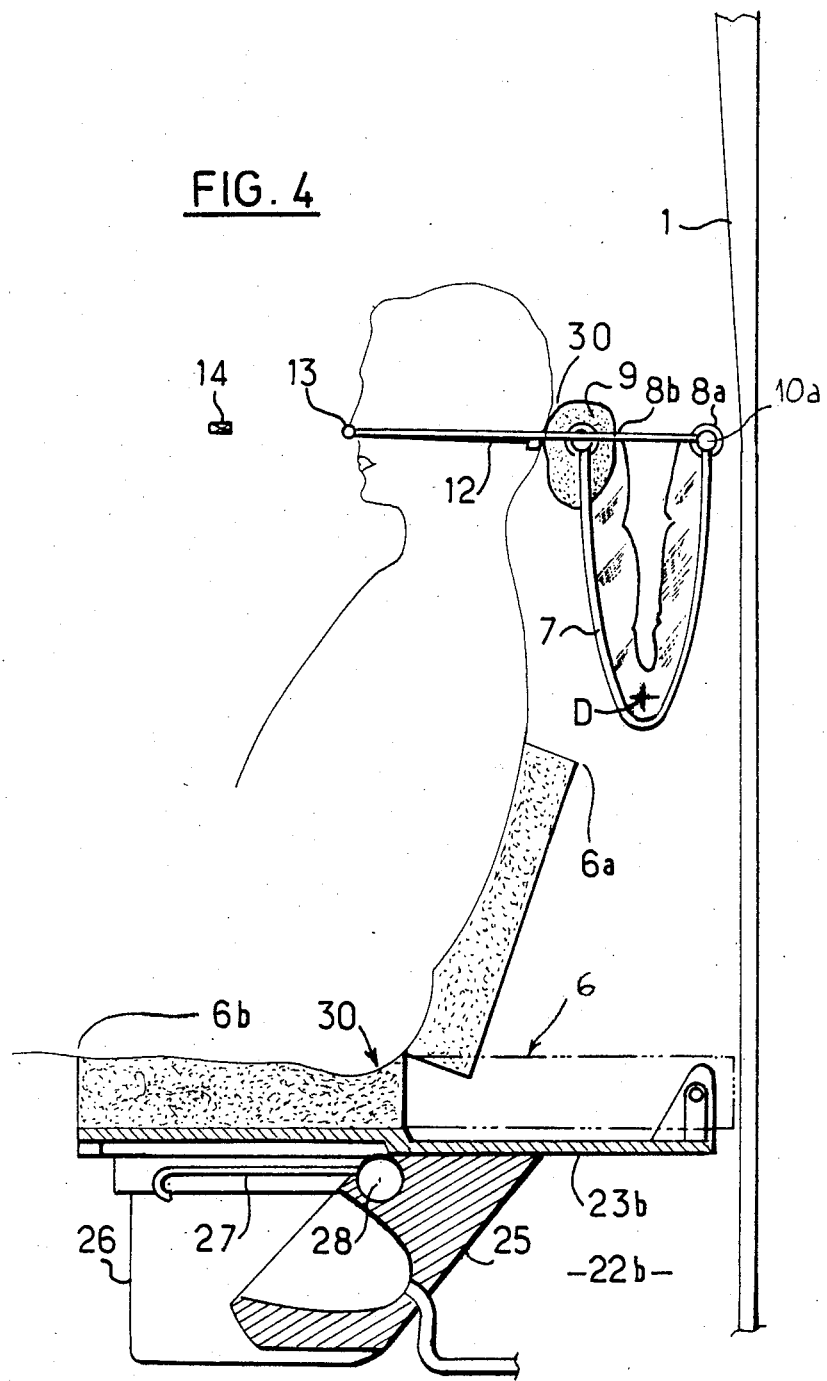
FIG. 4 is a median sectional view of the additional seat made from the bedding unit.

Tension arm 12 is mounted more particularly to pivot around shaft 13 between a first horizontal position shown in FIG. 3 in which bunk 7 is in use position and in which each of the tension arms is supported on a device 14 with which a catch can be associated. It should be noted that device 14 can be of any known type and can be made, for example, in the form of a hook carried by arm 12 able to engage in an eye forming a stop carried by wall 2. The second horizontal position of tension arms 12 is shown in FIG. 4 in which bunk 7 occupies the folded storage position around a median longitudinal axis D and in which the lengthwise sides 8a, 8b are brought together. In this position, padded rim 9 constitutes the headrest of additional seat 30 whose back is limited upward by raised lengthwise side 6a, while the other lengthwise side 6b limits toward the front the seating surface of this additional seat.

To round out the safety of the bedding position of upper bunk 7 against a possible break of device 14, padded rim 9 rests on driver's and passenger seats 4, 5.

Figure 5:
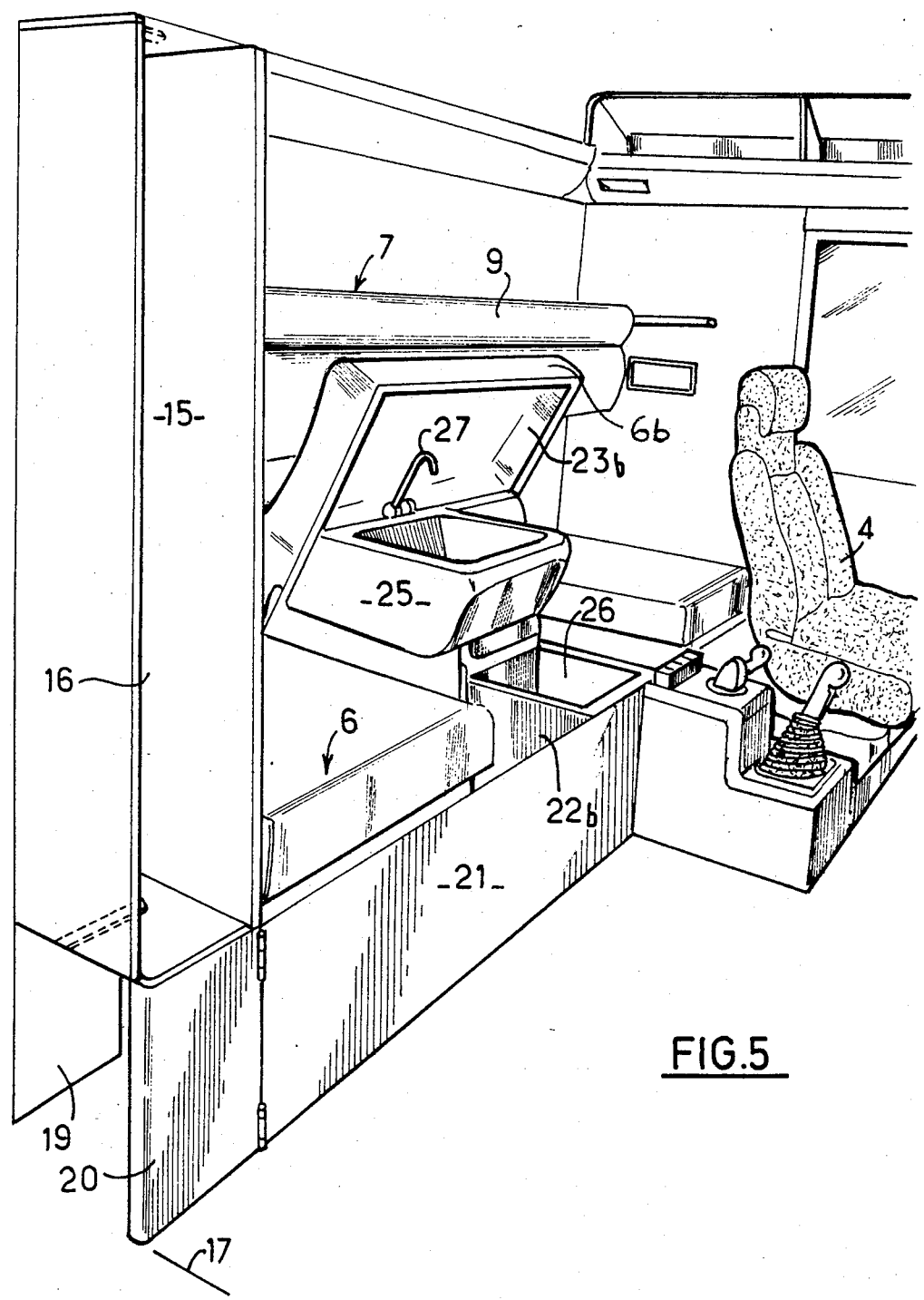
FIG. 5 is a perspective view of the bedding installation in nonuse position in which a part of the additional seat is lifted to gain access to a water tank.

The bedding installation is completed as shown in FIG. 5 by storage closet modules 15 whose vertical door 16 is mounted to rotate around a pin positioned so that said door 16, in closed position, is in crosswise extension of the door sill 17 of the cab and in the vicinity of the front edges of bunks 6, 7. Storage closet module 15 is limited laterally by the outside wall of the cab and side wall 2. It is completed by an independent shoe closet 19 provided with a flap 20. The arrangement of closet module 15 makes possible easy handling of its contents and that of door 16 from bunks 6, 7.

Lower bunk 6 rests on a hollow base 21 with compartments 22a, 22b, 22c, closed by independent covers 23a, 23b, 23c on which the mattress of bunk 6 rests. Compartment 22b is closed by cover 23b which supports the seating surface of additional seat 30.

Compartment 22b constitutes the housing of a sink 25 and a refrigerator 26. Sink 25, shown more clearly in FIGS. 4, 5, is contiguous with cover 23b whose lower face constitutes the element for controlling the movement of pivoting spout 27. With spout 27, which can occupy a raised position under the action of a spring shown in FIG. 5 and a deflected horizontal position shown in FIG. 4, is associated a valve 28 whose opening and closing control corresponds to the position of spout 27. In particular, valve 28 can be open when the spout is raised and is closed when the position of said spout is deflected horizontally by closing of cover 23b. In this position, sink 25 occupies a tipped, emptying position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A bedding installation for a road vehicle cab having a driver seat, a passenger seat, and a cab with a back wall and side walls, comprising:

upper and lower movable superposed bunks (6, 7) mounted behind said driver seat (4) and said passenger seat and respectively fastened to said back wall (1) of said cab and placed between said side walls of said cab wherein said lower bunk includes a fixed portion (6b) and a pivotable portion (6a) such that upon upward pivoting of said pivotal portion (6a), said lower bunk (6) forms a seat; and means for pivotably connecting said upper bunk (7) to said cab by a first lengthwise side of said upper bunk (7) and means for holding said upper bunk (7) by a second lengthwise side thereof in a first bedding position and a second, storage position wherein said upper bunk further comprises a padded rim (9) located on said first lengthwise side such that, in said second, storage position, said padded rim (9) comprises a headrest which is positioned above a first lengthwise side of said lower bunk (6) when said lower bunk forms said seat.

2. An installation as set forth in claim 1, further comprising a shaft (13) mounted on said side walls, a reinforcement element (10b) connected to said padded rim (9), and a tension arm (12) mounted at one end of said reinforcement element (10b) and pivotably mounted at a second end to said shaft (10a) mounted on said side wall.

3. An installation as set forth in claim 2, further comprising a support and locking device (14) fastened to said side wall of said cab wherein said tension arm is connected to said locking device in said first bedding position.

4. An installation as set forth in claim 1, further comprising a hollow base having a plurality of compartments (22a, 22b, 22c) with a corresponding plurality of covers (23a, 23b, 23c) mounted thereon wherein said lower bunk rests on said plurality of compartments.

5. An installation as set forth in claim 4, further comprising a pivoting spout and a sink located in said cab wherein a lower face of one of said covers further comprises a control element for moving said pivoting spout (27) for filling said sink (25).

6. An installation as set forth in claim 5, further comprising valve means (28) for controlling said spout as a function of a pivoting position of said spout (27) associated with said sink (25).

* * * * *